(12) United States Patent
Nafie et al.

(10) Patent No.: US 7,218,680 B1
(45) Date of Patent: May 15, 2007

(54) RETRANSMISSION TECHNIQUES FOR ENHANCED PERFORMANCE IN FADING WIRELESS COMMUNICATION CHANNELS

(75) Inventors: Mohammed H. Nafie, Richardson, TX (US); Anand G. Dabak, Plano, TX (US); Timothy M. Schmidl, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1088 days.

(21) Appl. No.: 09/715,668

(22) Filed: Nov. 16, 2000

Related U.S. Application Data

(60) Provisional application No. 60/185,780, filed on Feb. 29, 2000.

(51) Int. Cl.
*H04B 15/00* (2006.01)
(52) U.S. Cl. .................. 375/285; 375/223; 375/253; 370/203; 714/748
(58) Field of Classification Search ............ 375/285, 375/267, 278, 284, 313, 346, 219, 148, 349, 375/385, 347, 223, 225, 253; 370/392, 203; 714/748
See application file for complete search history.

(56) References Cited

U.S. PATENT DOCUMENTS

| 5,228,028 | A | * | 7/1993 | Cucchi et al. ............... 370/392 |
| 5,483,557 | A | * | 1/1996 | Webb ......................... 375/349 |
| 6,504,863 | B1 | * | 1/2003 | Hellmark .................... 375/219 |
| 6,553,063 | B1 | * | 4/2003 | Lin et al. .................... 375/223 |
| 6,574,270 | B1 | * | 6/2003 | Madkour et al. ........... 375/148 |
| 2006/0029168 | A1 | * | 2/2006 | Chuang et al. ............. 375/347 |

OTHER PUBLICATIONS

"Networks for Homes", Amitava Dutta-Roy, Contributing Editor, IEEE Spectrum, Communications, Dec. 1999, pp. 26-33.

* cited by examiner

*Primary Examiner*—Chieh M. Fan
*Assistant Examiner*—Eva Zheng
(74) *Attorney, Agent, or Firm*—Ronald O. Neerings; Wade James Brady, III; Frederick J. Telecky, Jr.

(57) ABSTRACT

A desired bit sequence (x) can be communicated over a wireless communication link (15) by including the desired bit sequence in each of a plurality of transmissions over the wireless communication link. In response to each of the plurality of transmissions, a received bit sequence corresponding to the desired bit sequence can be produced at the receiving end. A determination of the desired bit sequence can be made based on the received bit sequences ($r_1$–$r_N$) and information ($SNR_1$–$SNR_N$, $\alpha_1$–$\alpha_N$) indicative of communication quality associated with each of the plurality of transmissions.

16 Claims, 4 Drawing Sheets

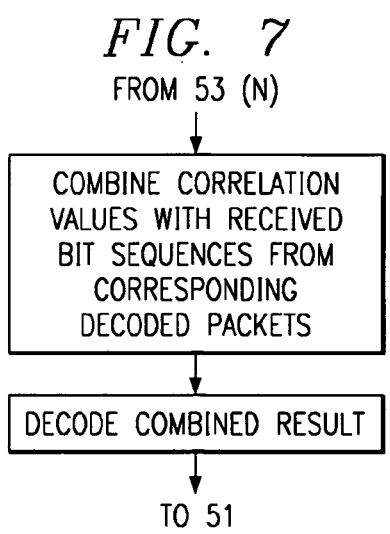
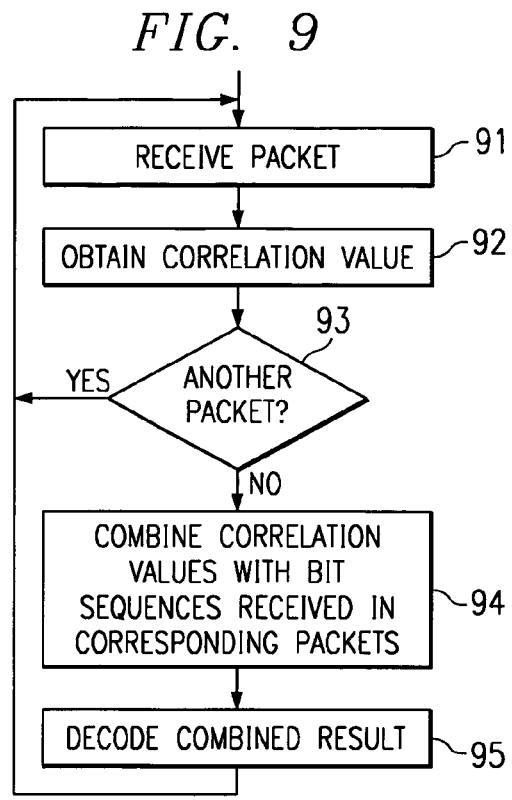
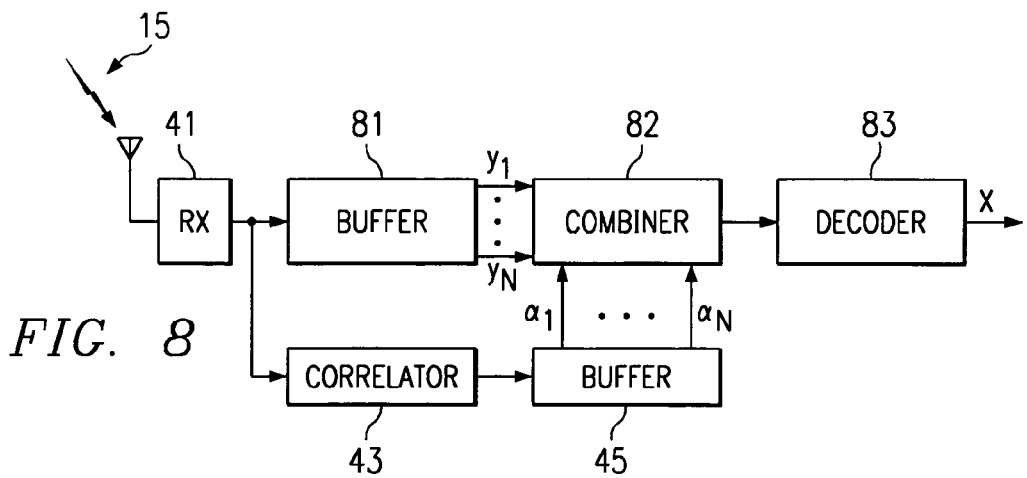
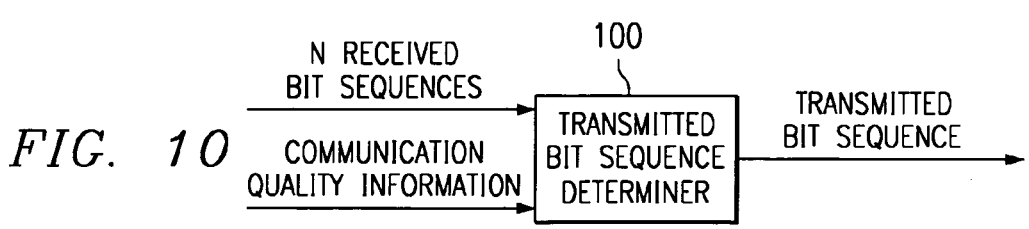

RETRANSMISSION TECHNIQUES FOR ENHANCED PERFORMANCE IN FADING WIRELESS COMMUNICATION CHANNELS

This application claims the priority under 35 U.S.C. 119(e)(1) of copending U.S. provisional application No. 60/185,780, filed on Feb. 29, 2000.

FIELD OF THE INVENTION

The invention relates generally to wireless communications and, more particularly, to wireless communications over fading channels.

BACKGROUND OF THE INVENTION

Present telecommunication system technology includes a wide variety of wireless networking systems associated with both voice and data communications. An overview of several of these wireless networking systems is presented by Amitava Dutta-Roy, *Communications Networks for Homes*, IEEE Spectrum, pg. 26, December 1999. Therein, Dutta-Roy discusses several communication protocols in the 2.4 GHz band, including IEEE 802.11 direct-sequence spread spectrum (DSSS) and frequency-hopping (FHSS) protocols. A disadvantage of these protocols is the high overhead associated with their implementation. A less complex wireless protocol known as Shared Wireless Access Protocol (SWAP) also operates in the 2.4 GHz band. This protocol has been developed by the HomeRF Working Group and is supported by North American communications companies. The SWAP protocol uses frequency-hopping spread spectrum technology to produce a data rate of 1 Mb/sec. Another less complex protocol is named Bluetooth after a $10^{th}$ century Scandinavian king who united several Danish kingdoms. This protocol also operates in the 2.4 GHz band and advantageously offers short-range wireless communication between Bluetooth devices without the need for a central network.

The Bluetooth protocol provides a 1 Mb/sec data rate with low energy consumption for battery powered devices operating in the 2.4 GHz ISM (industrial, scientific, medical) band. The current Bluetooth protocol provides a 10-meter range and an asymmetric data transfer rate of 721 kb/sec. The protocol supports a maximum of three voice channels for synchronous, CVSD-encoded transmission at 64 kb/sec. The Bluetooth protocol treats all radios as peer units except for a unique 48-bit address. At the start of any connection, the initiating unit is a temporary master. This temporary assignment, however, may change after initial communications are established. Each master may have active connections of up to seven slaves. Such a connection between a master and one or more slaves forms a "piconet." Link management allows communication between piconets, thereby forming "scattenets." Typical Bluetooth master devices include cordless phone base stations, local area network (LAN) access points, laptop computers, or bridges to other networks. Bluetooth slave devices may include cordless handsets, cell phones, headsets, personal digital assistants, digital cameras, or computer peripherals such as printers, scanners, fax machines and other devices.

The Bluetooth protocol uses time-division duplex (TDD) to support bi-directional communication. Spread-spectrum technology or frequency diversity with frequency hopping permits operation in noisy environments and permits multiple piconets to exist in close proximity. The frequency hopping scheme permits up to 1600 hops per second over 79 1-MHZ channels or the entire ISM spectrum. Various error correcting schemes permit data packet protection by ⅓ and ⅔ rate forward error correction. Further, Bluetooth uses retransmission of packets for guaranteed reliability. These schemes help correct data errors, but at the expense of throughput.

The Bluetooth protocol is specified in detail in *Specification of the Bluetooth System*, Version 1.0A, Jul. 26, 1999, which is incorporated herein by reference.

In wireless communication systems such as mentioned above, the well-known disadvantageous phenomenon of fading is encountered.

In a Bluetooth SCO (Synchronous Connection-Oriented) link, essentially used for voice communications, a packet of type HV1 can be used. This packet has 80 bits of data that are encoded using a ⅓ repetition code to produce 240 bits of coded data. In the receiver a majority decoding scheme is applied to decode the 80 bits. Since the communications link here is a wireless link and hence subject to fading, most of the errors will occur in packets subjected to severe fading.

It is therefore desirable to improve the quality of communication provided by a wireless communication channel that is subject to fading.

According to the invention, a bit sequence is transmitted over a wireless communication channel a plurality of times, and the receiving end can determine the transmitted bit sequence (1) by making a majority logic decision with respect to the received bit sequences or (2) based on the received bit sequences and corresponding quality information associated with the respective transmissions. Quality indicators associated with the respective transmissions can be compared or otherwise used in combination to determine the received bit sequence. The invention advantageously applies the effect of repetition coding across a plurality of transmissions, and thereby provides more gain in fading channels than prior art schemes.

BRIEF DESCRIPTION OF THE DRAWINGS

FIG. 7 illustrates exemplary operations which can be performed by the receiving station of FIG. 6.

FIG. 8 diagrammatically illustrates pertinent portions of exemplary embodiments of another wireless packet receiving station according to the invention.

FIG. 9 illustrates exemplary operations which can be performed by the receiving station of FIG. 8.

FIG. 10 diagrammatically illustrates pertinent portions of exemplary embodiments of a wireless packet receiving station according to the invention.

DETAILED DESCRIPTION

Figure 1:
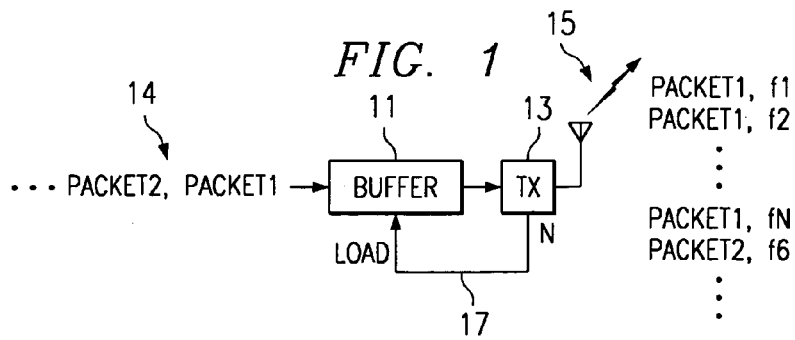
FIG. 1 diagrammatically illustrates pertinent portions of exemplary embodiments of a wireless packet transmitting station according to the invention.

FIG. 1 diagrammatically illustrates exemplary embodiments of a wireless packet transmitting station according to the invention. The transmitting station of FIG. 1 transmits each packet N times (an original transmission+N−1 retransmissions). In the example of FIG. 1, packet 1 is initially loaded into a buffer 11, and is sequentially transmitted by a wireless transmitter 13 over a wireless communications link 15 for a total of N transmissions. When the transmitter 13 has completed the Nth transmission, a signal 17 is output from the transmitter 13 in order to load the next packet, namely packet 2 into the buffer 11. Thereafter, packet 2 is transmitted N consecutive times, and the process is repeated for each packet in the packet sequence designated generally at 14. Also as shown in FIG. 1, each retransmission of a given packet, such as packet 1, can be performed at a different transmit frequency (f1, f2 . . . fN) thereby advantageously achieving diversity gain. As one example, the transmitting station of FIG. 1 can be a Bluetooth master device wherein, for example, all transmissions of packet 1 are directed to the same slave device during respective time slots of a conventional Bluetooth SCO link. As another example, the transmitting station of FIG. 1 could be a Bluetooth slave device wherein, for example, all transmissions of packet 1 are directed to an associated master device during respective time slots of a Bluetooth SCO link.

FIG. 10 diagrammatically illustrates pertinent portions of exemplary embodiments of a wireless packet receiving station according to the invention. The packet receiving station of FIG. 10 includes a transmitted bit sequence determiner 100 which receives (via an unillustrated wireless communications interface) N received bit sequences which each correspond to a transmitted bit sequence that has been included in each of N packets transmitted, for example, by the transmitting station of FIG. 1. The transmitted bit sequence determiner also receives communication quality information respectively corresponding to the N packet transmissions (and thus to the N received bit sequences). The transmitted bit sequence determiner 100 then makes a determination as to the transmitted bit sequence, based on the N received bit sequences and the corresponding communication quality information. In some embodiments the determiner 100 compares the communication quality information associated with the N received bit sequences, and thereby makes the determination of the transmitted bit sequence. In other embodiments the determiner 100 uses the communication quality information associated with the N received bit sequences to combine the N received bit sequences and thereby make the determination of the transmitted bit sequence. In still other embodiments, the determiner can include majority logic that applies a majority logic operation to the received sequences on a per bit basis. The bit-by-bit decisions of the majority logic operation constitute the determination of the transmitted bit sequence. The communication quality information is therefore not used in majority logic embodiments.

Figure 11:
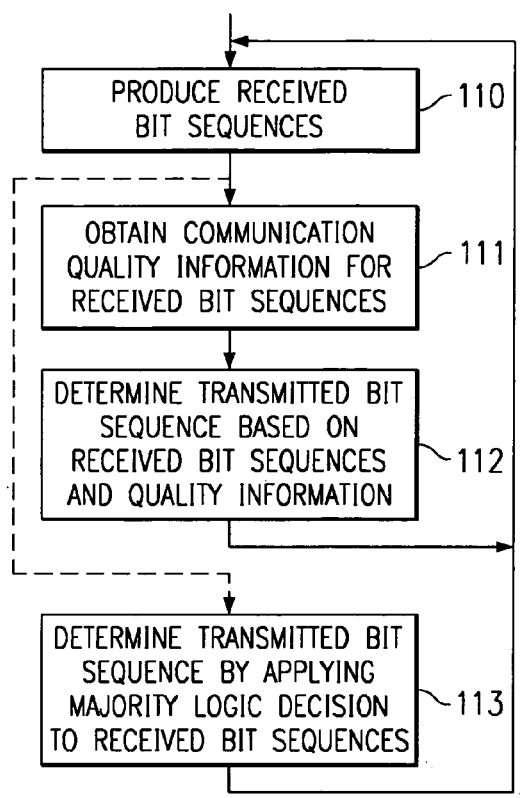
FIG. 11 illustrates exemplary operations which can be performed by the embodiments of FIG. 10.

FIG. 11 illustrates exemplary operations which can be performed by the wireless packet receiving station illustrated in FIG. 10. At 110, the received bit sequences are produced. The communication quality information associated with the received bit sequences is obtained at 111. At 112, a determination of the transmitted bit sequence is made based on the received bit sequences and the communication quality information. The use of majority logic to produce the determination of the transmitted bit sequence is illustrated at 113.

As will be evident hereinbelow, further exemplary embodiments of the present invention, described relative to FIGS. 2–9, advantageously incorporate inventive features described above with respect to FIGS. 10 and 11.

Assume that a packet transmitted over a wireless communication link includes a predetermined bit sequence. For each bit of the transmitted sequence, if the probability of receiving that bit in error is known, then the optimal receiver can be derived from principles of information theory. In particular, the goal is to maximize the a priori probability of receiving the transmitted sequence correctly. Thus, the optimal receiver would be:

$$\max_x p(r \mid x) \tag{1}$$

where r represents the received bit sequence and x represents the transmitted bit sequence (r and x can each include one or more bits) and p(r|x) represents the probability that the transmitted sequence x results in the received sequence r at the receiving end.

Because the respective probabilities associated with N transmissions of a packet (e.g., packet 1 in FIG. 1) are independent, Expression 1 above can be written as follows:

$$\max_x p(r_1 \mid x) p(r_2 \mid x) \ldots p(r_N \mid x), \tag{2}$$

where $r_1, r_2 \ldots r_N$ represent the received sequences respectively associated with packet transmissions 1 through N. The desired transmitted sequence x is that which maximizes the product of probabilities in Expression 2.

The probabilities in Expression 2 above would generally depend on the respective signal-to-noise ratios (SNRs), after fading, of the respective packet transmissions. If the SNRs can be estimated, then the probabilities in Expression 2 can be stored in a look-up table (in a suitable memory device) indexed against SNR. These probabilities can be determined, for example, empirically based on experimentation.

Figure 2:
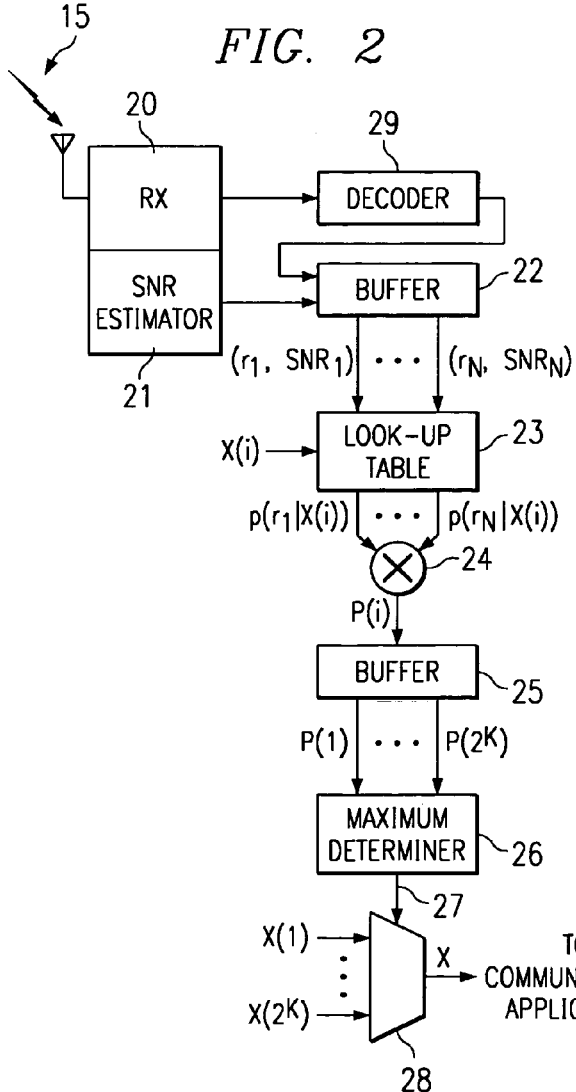
FIG. 2 diagrammatically illustrates pertinent portions of exemplary embodiments of a wireless packet receiving station according to the invention.

FIG. 2 diagrammatically illustrates pertinent portions of an exemplary embodiment of a wireless packet receiving station which can implement the optimal receiver represented by Expression 2 above. In FIG. 2, a conventional receiver at 20 uses conventional techniques to receive incoming packets transmitted over the wireless communication link 15 by the packet transmitting station of FIG. 1. A packet decoder is coupled to the receiver 20, and can use conventional techniques to decode N transmissions of a given packet. The N decoded packets, respectively including the N received sequences $r_1$–$r_N$, are stored in a buffer 22. The receiver 20 includes a SNR estimator 21 which can use conventional techniques to estimate the SNR associated with each of the N received packets. The estimated SNRs, designated $SNR_1$–$SNR_N$, are also input to the buffer 22. The received sequences $r_1$–$r_N$ and their corresponding SNR estimates $SNR_1$–$SNR_N$ are input to a look-up table 23. Also input to the look-up table 23 are all possible transmitted bit sequences, designated as x(i) in FIG. 2. If the transmitted sequence is known to be K bits long, then there are $2^K$ possible transmitted sequences. Thus the index i in x(i) can take integer values from 1 through $2^K$, one value for each possible transmitted sequence. For each of the $2^K$ possible transmitted sequences represented by x(i), N corresponding probabilities are (stored in and) obtained from the look-up table 23, one probability for each of the N packets.

For example, given a received sequence such as $r_1$ and its associated SNR estimate $SNR_1$, and given a selected one of the $2^K$ possible transmitted sequences x(i), for example x(4), a predetermined probability associated with the received sequence $r_1$ and its corresponding estimate $SNR_1$ and the possible transmitted sequence x(4) can be retrieved from the look-up table 23. The remaining N−1 probability values associated with x(4) correspond to $r_2$–$r_N$ and their respective estimates $SNR_2$–$SNR_N$. The N probability values obtained from table 23 are multiplied by multiplier 24 to produce a product P(i) (P(4) in this example) of the N probabilities associated with the particular possible transmitted sequence x(i) (see also Expression 2). This product P(i) is stored in a buffer 25 along with products of probabilities associated with the other possible transmitted sequences x(i). Thus, the buffer 25 includes $2^K$ products, one for each possible transmitted sequence x(i). These $2^K$ products P(1) ... P($2^K$) in the buffer 25 are input to a maximum determiner 26 that determines which of the 2 products is the largest, and outputs a signal 27 indicative of the largest product. This signal 27 is applied to a selector 28 to select the corresponding one of the $2^K$ possible transmitted sequences x(1), ... x($2^K$). The sequence selected by the selector 28 is taken to be the transmitted sequence x, and can be provided for use by a communication application.

Figure 3:
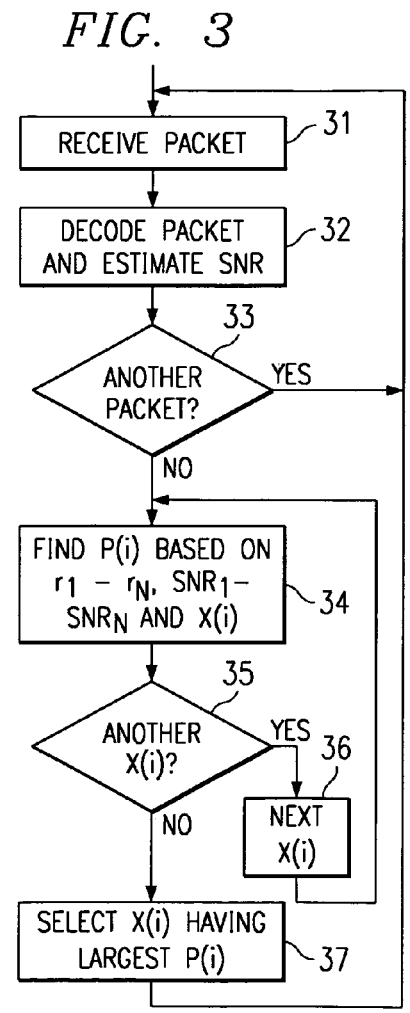
FIG. 3 illustrates exemplary operations which can be performed by the receiving station of FIG. 2.

FIG. 3 illustrates exemplary operations which can be performed by the receiving station of FIG. 2. After a packet is received at 31, it is decoded at 32, and its associated SNR is estimated. The operations at 31 and 32 are repeated until it is determined at 33 that all transmissions of the packet have been received. Thereafter at 34 the product of probabilities P(i) is determined based on the received sequences ($r_1$–$r_N$), their estimated SNRs ($SNR_1$–$SNR_N$), and the i th possible transmitted sequence (x(i)). As shown at 35 and 36, the operations at 34 are repeated until all of the $2^K$ possible transmitted sequences x(i) have been considered. Thereafter at 37, the possible transmitted sequence x(i) having the largest associated product P(i) is selected.

Figure 4:
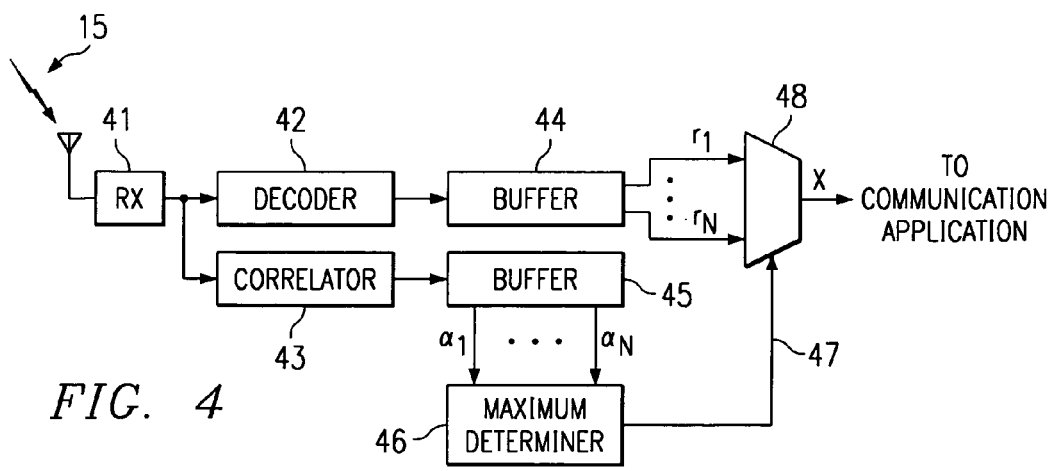
FIG. 4 diagrammatically illustrates pertinent portions of exemplary embodiments of another wireless packet receiving station according to the invention.

FIG. 4 diagrammatically illustrates pertinent portions of a further exemplary embodiment of a wireless packet receiving station according to the invention. The packet receiving station of FIG. 4 includes a conventional receiver 41 which can use conventional techniques to receive packets transmitted over the wireless communication link 15 by the packet transmitting station of FIG. 1. A conventional packet decoder 42 is coupled to the receiver 41 for decoding each of the N packets received from the transmitting station. The N decoded packets, respectively including received bit sequences $r_1$–$r_N$, are stored in a buffer 44 coupled to an output of the decoder 42.

The N packets received from the transmitting station are also input to a correlator 43 coupled to the receiver 41. The correlator 43 can use conventional techniques to provide respective correlation values (e.g., maximum correlation values) for the N received packets. These correlation values, designated as $\alpha_1$–$\alpha_N$ in FIG. 4, are stored in a buffer 45 coupled to an output of the correlator 43. The correlator 43 can correlate with the longest known part of the received packets, for example a known header portion. In Bluetooth embodiments, the correlator can perform conventional sync word correlation to produce the correlation values $\alpha_1$–$\alpha_N$. The correlation values stored in the buffer 45 are input to a maximum determiner 46 which determines the largest of the correlation values $\alpha_1$ and $\alpha_N$ and outputs a signal 47 indicative thereof. The signal 47 controls a selector 48 appropriately to select the one of the buffered bit sequences $r_1$–$r_N$ that corresponds to the largest of the correlation values $\alpha_1$–$\alpha_N$. The selected received bit sequence is taken to be the transmitted sequence x, and can be provided to a communication application.

The wireless packet receiving station illustrated in FIG. 4 can be, for example, a Bluetooth packet receiving station such as a Bluetooth master device or a Bluetooth slave device. In Bluetooth embodiments, the sequence x output from the selector 48 can be produced by applying the sign function to the selected one of the received bit sequences $r_1$–$r_N$, that is, sign (selected one of bit sequences $r_1$–$r_N$).

Figure 5:
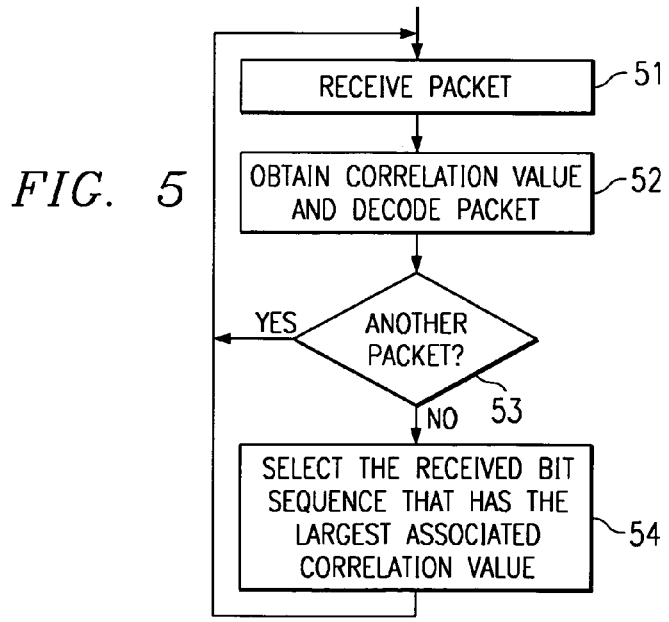
FIG. 5 illustrates exemplary operations which can be performed by the receiving station of FIG. 4.

FIG. 5 illustrates exemplary operations which can be performed by the wireless packet receiving station of FIG. 4. At 51–53, each of the N transmitted packets is received and decoded, and the corresponding N correlation values are obtained. Thereafter at 54, the received bit sequence that has the largest associated correlation value is selected.

Figure 6:
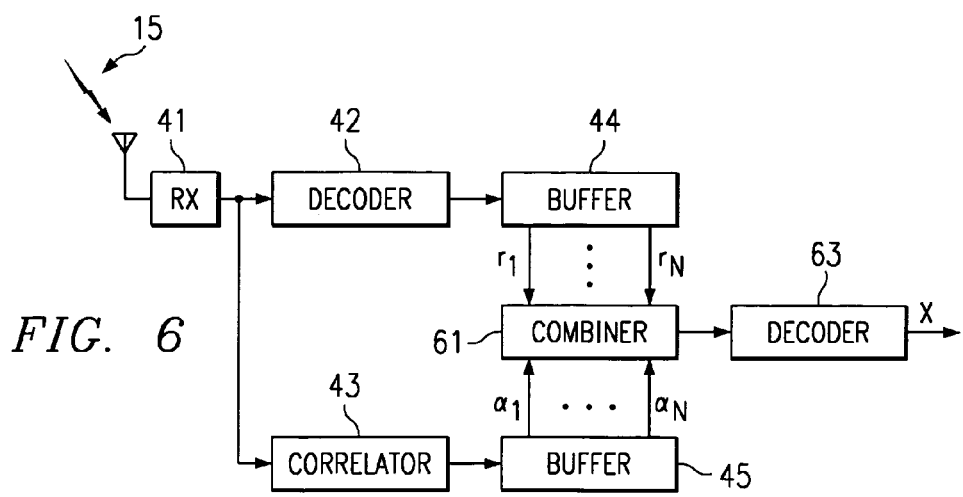
FIG. 6 diagrammatically illustrates pertinent portions of exemplary embodiments of another wireless packet receiving station according to the invention.

FIG. 6 diagrammatically illustrates pertinent portions of further exemplary embodiments of a wireless packet receiving station according to the invention. The packet receiving station of FIG. 6 can produce and buffer the received bit sequences $r_1$–$r_N$ and the correlation values $\alpha_1$–$\alpha_N$ in generally the same fashion as described above with respect to FIG. 4. The received bit sequences $r_1$–$r_N$ and the correlation values $\alpha_1$–$\alpha_N$ are input to a combiner 61 which combines the received bit sequences and associated correlation values as follows:

$$\sum_{j=1}^{N} |\alpha_j|^2 r_j \quad (3)$$

In this combining operation, the correlation values $\alpha_1$–$\alpha_N$ are essentially used as estimates of the fading amplitudes respectively associated with the N transmitted packets. In some embodiments, $|\alpha_j|$ can be used in Expression 3 instead of $|\alpha_j|^2$. The output of the combiner 61 is coupled to a conventional packet decoder 63, which decodes the output of combiner 61 to produce the receiving station's determination of the desired transmitted sequence x.

FIG. 7, when considered in conjunction with FIG. 5, illustrates exemplary operations which can be performed by the packet receiving station of FIG. 6. As can be seen from FIGS. 5 and 7, after the N packets have been received, decoded and correlated at 51–53 in FIG. 5, the correlation values are combined at 71 with the received bit sequences from the corresponding decoded packets. Thereafter at 72, the result of the combining operation 71 is decoded, after which operations can return to 51 in FIG. 5.

FIG. 8 diagrammatically illustrates pertinent portions of further exemplary embodiments of a wireless packet receiving station according to the invention. In the packet receiving station of FIG. 8, the correlation values $\alpha_1$–$\alpha_N$ can be obtained and buffered in generally the same fashion as described above with respect to FIGS. 4 and 6. However, in the packet communication station of FIG. 8, the N packets received by receiver 41, including bit sequences $y_1$–$y_N$ corresponding to the transmitted bit sequence x, are buffered at 81 without decoding. The bit sequences $y_1$–$y_N$ are then provided to a combiner 82 along with the correlation values $\alpha_1$–$\alpha_N$. The combiner 82 combines the bit sequences $y_1$–$y_N$ with the correlation values $\alpha_1$–$\alpha_N$ as follows:

$$\sum_{j=1}^{N} |\alpha_j|^2 y_j. \quad (4)$$

In some embodiments, $|\alpha_j|$ can be used in Expression 4 instead of $|\alpha_j|^2$. The combiner 82 includes an output coupled to a conventional packet decoder 83. The packet decoder 83 decodes the output of the combiner 82, thereby producing the receiving station's determination of the desired transmitted sequence x.

FIG. 9 illustrates exemplary operations which can be performed by the packet receiving station of FIG. 8. At 91–93, all N packets are received, and their corresponding correlation values are obtained. Thereafter at 94, the correlation values are combined with the bit sequences received in the corresponding packets. Thereafter at 95, the result of the combining operation 94 is decoded.

The exemplary wireless packet receiving stations illustrated in FIGS. 6 and 8 can be, for example, Bluetooth master and slave devices. In such Bluetooth embodiments, the outputs of the combiners 61 and 82 can represent the sign function applied respectively to Expressions 3 and 4 above, namely, sign $$\left( \sum_{j=1}^{N} |\alpha_j|^2 r_j \right)$$

and sign $$\left( \sum_{j=1}^{N} |\alpha_j|^2 y_j \right).$$

Figure 12:
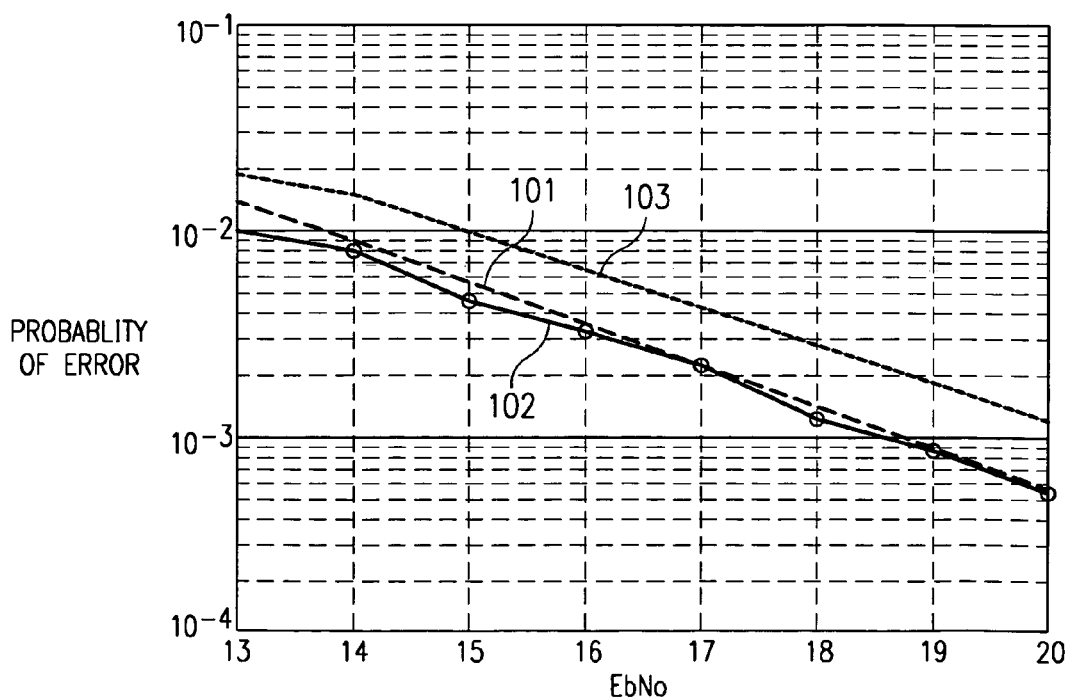
FIG. 12 illustrates simulation results achieved according to the invention.

FIG. 12 illustrates simulation results which show examples of the performance of the embodiments of FIGS. 4 and 5 (101), the embodiments of FIGS. 6–9 (102), and majority logic embodiments (103). As shown in FIG. 10, the embodiments of FIGS. 4–9 generally provide 1.5 dB of gain at a bit error rate of $10^{-3}$.

It will be recognized by workers in the art that the embodiments of FIGS. 1–11 can be readily implemented, for example, by suitable modifications in software, hardware, or a combination of software and hardware, in conventional wireless packet transmitting and receiving stations, for example Bluetooth master and slave devices.

Although exemplary embodiments of the invention are described above in detail, this does not limit the scope of the invention, which can be practiced in a variety of embodiments.

What is claimed is:

1. A method of communicating a desired bit sequence over a wireless communication link, comprising:
    including the desired bit sequence a number N times in a plurality of transmissions over the wireless communication link, wherein the number N is greater than one;
    producing in response to each of the transmissions a received bit sequence corresponding to the desired bit sequence;
    obtaining information indicative of communication quality associated with each of the a plurality of transmissions; and
    making a determination of the desired bit sequence based on a combination of the received bit sequences and the communication quality information;
    wherein said obtaining step includes obtaining a plurality of correlation values respectively associated with the plurality of transmissions; and
    wherein said making step includes combining the received bit sequences with the corresponding correlation values;
    wherein said combining includes multiplying each of the received bit sequences by one of the corresponding correlation value and the square of the corresponding correlation value to produce a plurality of multiplication results.

2. The method of claim 1, including transmitting the plurality of transmissions on respectively different transmission frequencies.

3. The method of claim 1, wherein the wireless communication link is a Bluetooth link.

4. The method of claim 1, wherein said producing step includes decoding each of a plurality of packets which are respectively included in the plurality of transmissions and in each of which is included the desired bit sequence.

5. A method of communicating a desired bit sequence over a wireless communication link, comprising:
    including the desired bit sequence in each of a plurality of transmissions over the wireless communication link;
    producing in response to each of the plurality of transmissions a received bit sequence corresponding to the desired bit sequence;
    obtaining information indicative of communication quality associated with each of the plurality of transmissions; and
    making a determination of the desired bit sequence based on the received bit sequences and the communication quality information,
    wherein said making step includes providing in response to the received bit sequences and the communication quality information a plurality of predetermined probabilities that the respective received bit sequences correspond to a predetermined bit sequence that could possibly be the desired bit sequence, and
    wherein said making step includes multiplying the predetermined probabilities together to produce a product.

6. The method of claim 5, wherein said making step includes performing said probability providing step and said multiplying step for a plurality of predetermined bit sequences that could possibly be the desired bit sequence in order to produce a plurality of products respectively corresponding to the plurality of predetermined bit sequences.

7. The method of claim 6, wherein said making step includes making a determination that the predetermined bit sequence corresponding to the largest of the products is the desired bit sequence.

8. A method of communicating a desired bit sequence over a wireless communication link, comprising:
    including the desired bit sequence in each of a plurality of transmissions over the wireless communication link;
    producing in response to each of the plurality of transmissions a received bit sequence corresponding to the desired bit sequence;
    obtaining information indicative of communication quality associated with each of the plurality of transmissions; and making a determination of the desired bit sequence based on the received bit sequences and the communication quality information,
wherein said obtaining step includes obtaining a plurality of correlation values respectively associated with the plurality of transmissions,
wherein said making step includes combining the received bit sequences with the corresponding correlation values, and
wherein said combining includes multiplying each of the received bit sequences by one of the corresponding correlation value and the square of the corresponding correlation value to produce a plurality of multiplication results.

9. The method of claim 8, wherein said combining step includes summing the multiplication results together to produce a summation result, said making step including decoding the summation result and making a determination that the decoded summation result is the desired bit sequence.

10. A wireless communication apparatus, comprising:
a first input for receiving a number N of received bit sequences respectively produced in response to the number N of a plurality of transmissions received via a wireless communication link, each of said received bit sequences corresponding to a same desired bit sequence included in each of said plurality of transmissions and wherein the number N is greater than one;
a second input for receiving information indicative of communication quality associated with each of the plurality of transmissions; and
a determiner coupled to the inputs for making a determination of the desired bit sequence based on a combination of the received bit sequences and the communication quality information; and
a correlator coupled to said second input for producing a plurality of correlation values respectively associated with said plurality of transmissions and providing the correlation values to said second input;
wherein said determiner includes a combiner coupled to said first and second inputs for combining the received bit sequences with the corresponding correlation values; and
wherein said combiner is operable for multiplying each of the received bit sequences by one of the corresponding correlation value and the square of the corresponding correlation value to produce a plurality of multiplication results.

11. The apparatus of claim 10, provided as a Bluetooth device.

12. The apparatus of claim 10, wherein each of said plurality of transmissions includes a packet having therein the desired bit sequence, and including a decoder coupled to said first input for receiving said packets via the wireless communication link and for decoding said packets to produce the respective bit sequences.

13. A wireless communication apparatus, comprising:
a first input for receiving a number N of received bit sequences respectively produced in response to the number N of a plurality of transmissions received via a wireless communication link, each of said received bit sequences corresponding to a desired bit sequence included in each of said plurality of transmissions and wherein the number N is greater than one;
a second input for receiving information indicative of communication quality associated with each of the plurality of transmissions; and
a determiner coupled to the inputs for making a determination of the desired bit sequence based on the received bit sequences and the communication quality information,
wherein said determiner is operable for providing in response to the received bit sequences and the communication quality information a plurality of predetermined probabilities that the respective bit sequences correspond to a predetermined bit sequence that could possibly be the desired bit sequence, and
wherein said determiner is operable for multiplying the predetermined probabilities together to produce a product.

14. The apparatus of claim 13, wherein said determiner is operable to provide, for each of a plurality of predetermined bit sequences that could possibly be the desired bit sequence, a plurality of predetermined probabilities that the respective received bit sequences correspond to the predetermined bit sequence, said determiner further operable to multiply together the plurality of predetermined probabilities associated with each of said predetermined bit sequences in order to produce a plurality of products respectively corresponding to the plurality of predetermined bit sequences.

15. The apparatus of claim 14, wherein said determiner is operable for making a determination that the predetermined bit sequence corresponding to the largest of the products is the desired bit sequence.

16. A wireless communication apparatus, comprising:
a first input for receiving a plurality of received bit sequences respectively produced in response to a plurality of transmissions received via a wireless communication link, each of said received bit sequences corresponding to a desired bit sequence included in each of said plurality of transmissions;
a second input for receiving information indicative of communication quality associated with each of the plurality of transmissions; and
a determiner coupled to the inputs for making a determination of the desired bit sequence based on the received bit sequences and the communication quality information,
a correlator coupled to said second input for producing a plurality of correlation values respectively associated with said plurality of transmissions and providing the correlation values to said second input,
wherein said determiner includes a combiner coupled to said first and second inputs for combining the received bit sequences with the corresponding correlation values,
wherein said combiner is operable for multiplying each of the received bit sequences by one of the corresponding correlation value and the square of the corresponding correlation value to produce a plurality of multiplication results, and
wherein said combiner is operable for summing the multiplication results together to produce a summation result, said determiner including a decoder coupled to said combiner for decoding the summation result.

* * * * *